(No Model.) 3 Sheets—Sheet 1.
J. F. G. DE BONARDI & A. D. F. DE VILLEPIGUE.
GARBAGE BURNING FURNACE.
No. 600,855. Patented Mar. 22, 1898.
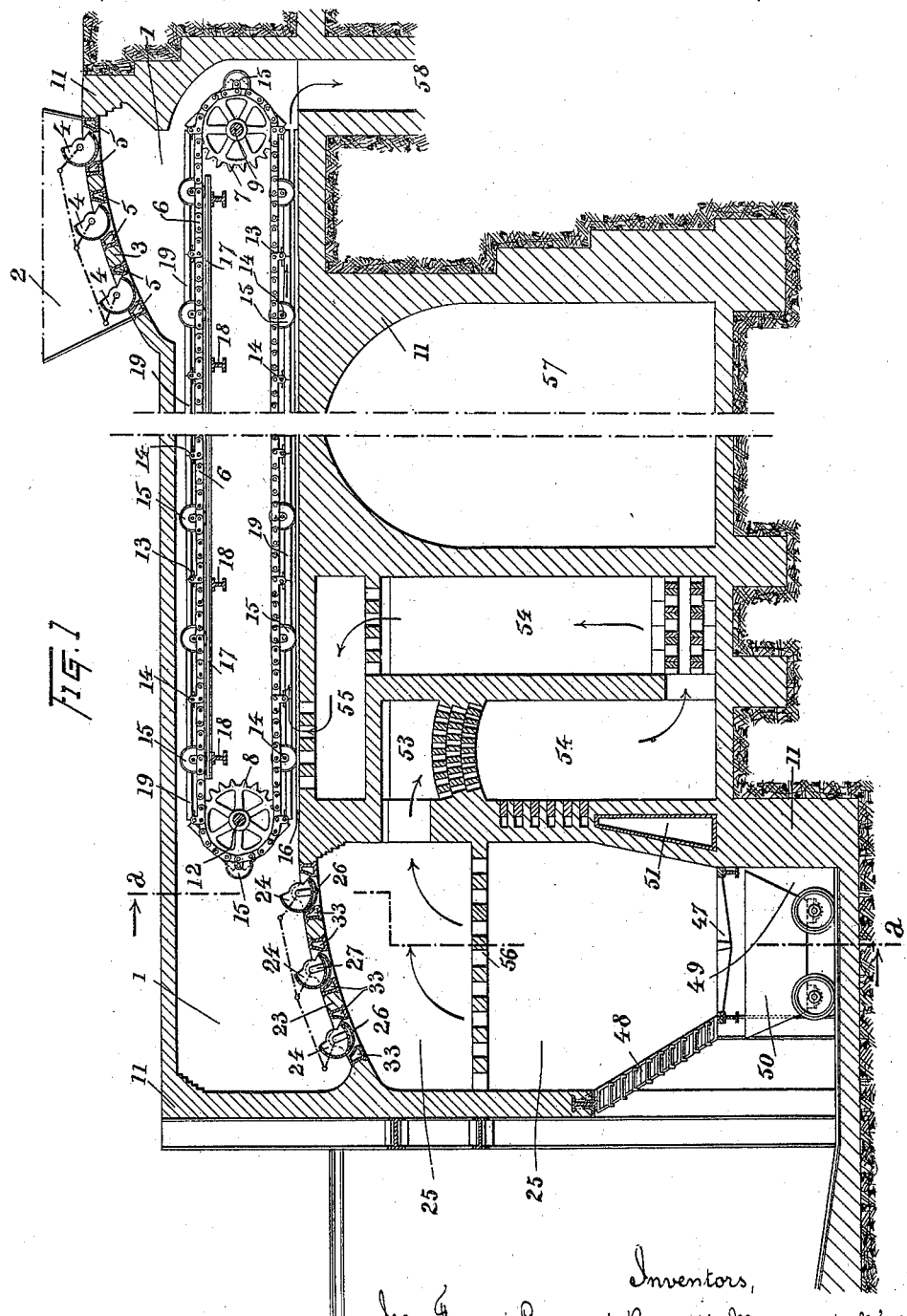

(No Model.) 3 Sheets—Sheet 2.
J. F. G. DE BONARDI & A. D. F. DE VILLEPIGUE.
GARBAGE BURNING FURNACE.
No. 600,855. Patented Mar. 22, 1898.
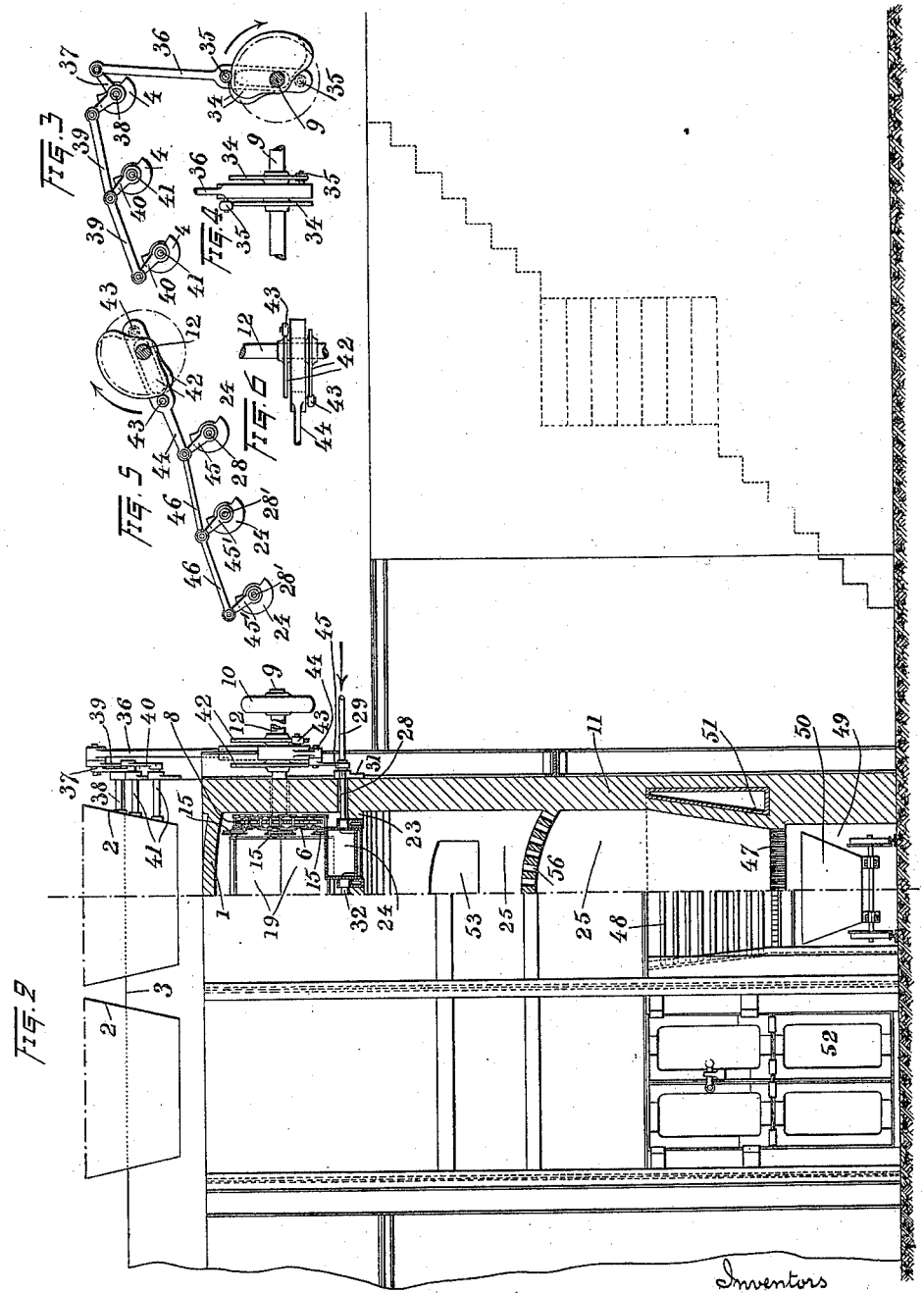
Witnesses
H. van Oldenneel
Otto Munk
Inventors
Jean François Georges de Bonardi, Marquis du Ménil
Auguste Denis Floran de Villepigue
by Richardson
Attorneys
THE NORRIS PETERS CO., PHOTO-LITHO., WASHINGTON, D. C.

(No Model.) 3 Sheets—Sheet 3.
J. F. G. DE BONARDI & A. D. F. DE VILLEPIGUE.
GARBAGE BURNING FURNACE.
No. 600,855. Patented Mar. 22, 1898.
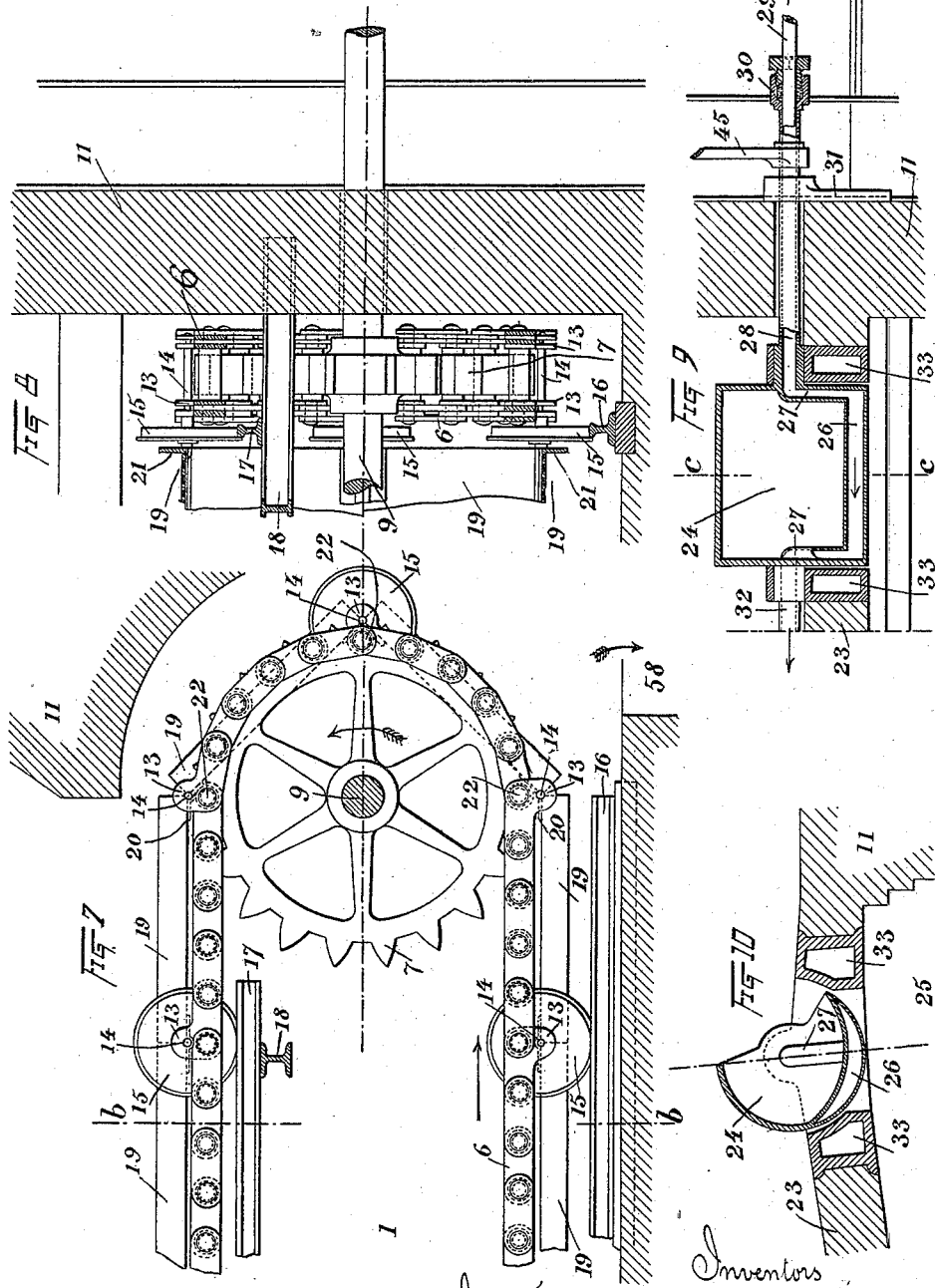

UNITED STATES PATENT OFFICE.

JEAN FRANÇOIS GEORGES DE BONARDI, OF VERSAILLES, AND AUGUSTE DENIS FLORAN DE VILLEPIGUE, OF PARIS, FRANCE.

GARBAGE-BURNING FURNACE.

SPECIFICATION forming part of Letters Patent No. 600,855, dated March 22, 1898.

Application filed January 25, 1896. Renewed August 24, 1897. Serial No. 649,389. (No model.)

*To all whom it may concern:*

Be it known that we, JEAN FRANÇOIS GEORGES DE BONARDI, Marquis du Ménil, residing in Versailles, and AUGUSTE DENIS FLORAN DE VILLEPIGUE, residing in Paris, France, citizens of the Republic of France, have invented certain new and useful Improvements in Garbage-Burning Furnaces; and we do hereby declare that the following is a full, clear, and exact description of the same.

The object we have in view to accomplish is mainly the recovery of ammonia from refuse matter, such as swill and city garbage, while at the same time destroying the refuse matter by incineration. We accomplish this object by a special method and a special furnace, both of which form the subject-matter of the present application. The method followed in accomplishing the said object is based upon the combination of two distinct chemical reactions. The first reaction, by which the organic matter yields up its own ammonia, requires low temperatures not exceeding from 450° to 500° centigrade. The second reaction requires, on the contrary, high temperatures, ranging from, say, 1,200° to 1,500° centigrade. This method is carried into effect in a practically closed space and is conducted in a furnace comprising two distinct chambers, in which the two reactions take place respectively and simultaneously. In the one chamber, in which the first-named reaction takes place and which we will call the "distilling-chamber," the volatile elements of the refuse matter are subjected to distillation, and in the other chamber, which we will call the "incinerating-chamber," the remainder of the refuse matter so treated is subsequently incinerated. The whole operation is a continuous one. The fire-gases produced in the incinerating-chamber are conducted through suitable heat-absorbing passages and flues to the distilling-chamber, into which latter they issue at such a reduced degree of heat as to be adapted for the proper accomplishment of the reaction in the distilling-chamber. The products resulting from combustion and distillation are conveyed from the distilling-chamber to suitable apparatus, wherein they are washed and are otherwise dealt with for the purpose of recovering the ammonia therein contained. The characteristic feature of this method lies in that the distilling action takes place completely shielded from oxygen, since any introduction of air from the atmosphere into the distilling-chamber is practically prevented on the one hand, while on the other hand the oxygen contained in the air forced in the apparatus for supporting combustion in the incinerating-chamber is substantially converted into carbonic-acid gas as it passes through the ignited mass of material burning in the incinerating-chamber. In other words, the gaseous atmosphere in the distilling-chamber is a reducing atmosphere and not an oxidizing atmosphere. The materials cannot become oxygenized, as there is no entrance of air, and consequently there will not be any proportional loss in the amount of ammonia recovered.

This invention constitutes a valuable advance over the known system of furnace in which an attempt is made to effect the treatment in a closed space and also to divide the space wherein the garbage is treated into two chambers, the difference being mainly that, on the one hand, the two chambers we use are distinctly separate from each other and that they both have their distinctly different degrees of temperature, suitable for the respective reactions to take place therein, while, on the other hand, we have introduced special means for so separating both chambers from each other that the material under treatment can be transferred from time to time from the distilling-chamber into the incinerating-chamber without practically destroying or materially influencing the difference in the degrees of heat prevailing in each chamber. Moreover, a further improvement over the said system resides in the special means for enabling the refuse matter to be charged intermittently into the furnace without enabling atmospheric air to enter the apparatus, practically speaking, while such charging operation is going on. Furthermore, the apparatus which we have devised differs as to construction and operation from the system hereinbefore referred to.

In the accompanying drawings we have shown a furnace as devised for the carrying out of the hereinbefore-specified method. The furnace is shown, by way of example, as arbitrarily comprising two adjacent cells for the treatment of city garbage.

Figure 1 is a longitudinal vertical section of the furnace. Fig. 2 is an elevation, partly in section, on the line *a a* of Fig. 1, looking in the direction of the arrows. Figs. 3, 4, 5, and 6 are details of the means for operating the valves for introducing the garbage into the apparatus and into the fire-chamber. Fig. 7 shows a detail of the endless conveyer on a larger scale. Fig. 8 is a section on line *b b* of Fig. 7. Fig. 9, on a larger scale, is a sectional elevation of one of the valves used for transferring the refuse matter from the distilling-chamber to the incinerating-chamber. Fig. 10 is a vertical section on the line *c c* of Fig. 9.

1 is the distilling-chamber, over which is formed a feed-hopper 2, into which the refuse matter to be treated is dumped. Into the wall 3, separating the distilling-chamber 1 from the hopper 2, are fitted rocking valves 4 4 4 in any suitable number and position and preferably made of metal. The openings of the wall 3, into which the valves 4 are fitted, are preferably provided with metal facings 5, with which the valves coöperate in producing a practically air-tight joint. Within the distilling-chamber 1 is arranged a conveyer composed of two endless chains 6 6, of which one only is shown in Figs. 2 and 8, both chains moving over two sprocket-wheels 7 at one end of the chamber and over two other sprocket-wheels 8 at the other end of the chamber, one only of such wheels 7 8 being shown. The two sprocket-wheels 7 are fast upon a shaft 9, which is the first-motion shaft of the whole apparatus and which receives a continuous rotary movement from any suitable source of power imparted to a pulley-belt 10, Fig. 2. The said shaft is suitably mounted in bearings (not shown) which may be connected to or laid in the brickwork 11 of the apparatus. The two other sprocket-wheels 8 are fast upon a shaft 12, which is likewise mounted in suitable bearings. (Not shown.) At intervals the links composing the chains 6 are provided with outwardly-projecting lugs 13, which are oppositely positioned in both chains. Through each pair of oppositely-positioned lugs 13 is passed an axis 14, on each of which are fast two flanged wheels 15, moving on rails 16, laid upon the flooring of the distilling-chamber 1. The wheels connected to the lower member of the chain 6 rest upon the rails 16, while those connected to the upper member rest upon rails 17, supported by transverse girders 18, attached to the brickwork. To the endless chains 6 is applied a set of trays 19, which are connected by hinges 20, Fig. 7, to the axis 14. Each tray 19 is preferably formed of perforated sheet metal and has lengthwise-upturned sides 21, Fig. 8, while the transverse edges are not upturned, but are flush with the end of the adjacent trays, thus forming a continuous horizontal surface for conveying the refuse matter. In a conveyer so constructed the distance from the center of one axis 14 of one tray to the center of an adjacent axis must be exactly equal to the development of the curved line drawn from the center of one axis 22, Fig. 7, to the center of another axis 22 of the chain-links with which the lugs 13 form part.

At the end of the distilling-chamber 1, opposite to that at which the refuse matter is introduced from the feed-hopper 2, is formed a wall or vault 23, beneath which is the incinerating-chamber, and in which are arranged valves 24, in any suitable number and position for transferring the refuse matter from the distilling-chamber 1 into the incinerating-chamber 25. The valves 24 are similar to the charging-valves 4 and are likewise rocked by a mechanism to be described; but as they are subjected to a greater degree of heat than the valves 4 they are hollow at such portion thereof, which is directly exposed to the action of the heat in the incinerating-chamber 25, and a current of cold water or other refrigerating medium is caused to circulate through the said portion. As shown in Figs. 9 and 10, each valve 24 is formed with a hollow space 26, which communicates at both ends of the valve with a duct 27, leading into a pipe 28, forming an extension of the valve and connected with a water-inlet pipe 29, a tight joint between the pipes 28 and 29 being secured by a stuffing-box 30, Fig. 9. The extension of the pipe 28 acts at the same time as an axis which is supported in a bearing 31, and to which a rocking motion is imparted by a mechanism to be described. Refrigerating-water forced into the inlet-pipe 29 passes through the extension 28, duct 27, hollow space 26, and duct 27 and escapes at the other end of the valve through an outlet-pipe 32. The above means for refrigerating the valves and preventing injury due to high temperatures has only been set forth herein as an illustration of the arrangement that can be employed for accomplishing the purpose. Any one skilled in the art will be able to conceive equivalent arrangements without departing from the object to be attained. The openings in the vault or wall 23 are likewise provided with metal facings 33, which in this instance are subjected internally to a circulation of cold water. The arrangement in this instance is obvious, and will therefore not need to be specified.

The mechanism for imparting rocking motion to the valves 4 of the feed-hopper 2 is as follows: Upon the first-motion shaft 9 are fastened two cams 34 34, Figs. 3 and 4, coöperating with two bowls 35 35, mounted on the opposite sides of a slotted connecting-rod 36, guided by the shaft 9 itself, which passes through the slot of the said rod. The connecting-rod 36 is jointed to an elbow-lever 37, fast upon the axis 38 of the first valve 4, the lever 37 being in turn connected by two links 39 39 to arms 40 40, fast upon the end of the axis 41 41 of each of the remaining valves 4. It will thus be understood that rotary movement of the shaft 9 will cause the cams 34 to impart to-and-fro motion to the connecting-rod 36 and consequent periodical oscillating movement to the valves 4.

The mechanism for imparting rocking motion to the valves 24 in the vault 23 is as follows: Upon the shaft 12 of the sprocket-wheels 18 are fastened two cams 42, Figs. 2, 5, and 6, coöperating with two bowls 43 43, mounted on the opposite sides of a slotted connecting-rod 44, guided by the shaft 12 itself, which passes through the slot of the said rod. The connecting-rod 44 is jointed to the end of an arm 45, fast upon the hollow axis (or pipe) 28 of the first valve 24, the said arm being in turn connected by links 46 46 to arms 45' 45', fast upon the end of the axis 28' 28' of each of the remaining valves 24. The action is obvious.

The incinerating-chamber 25 comprises an ordinary fire-grate 47 and a Siemens grating 48, both of which are cooled by an internal circulation of water, as is usual in grates exposed to intense heat. In the ash-pit 49 can be run a car 50 for receiving and removing ashes. The atmospheric air necessary for combustion is caused to circulate through one or more special metal-lined ducts 51, embedded in the brickwork 11, Figs. 1 and 2, wherein it absorbs heat before it is forced by fans or blowers to the fire-grate 47. Access is had to the ash-pit for letting the car in and out at intervals and for other purposes by a gate 52, (one for each cell, Fig. 2,) which closes up the front of the furnace and prevents atmospheric air from entering the same, so that only the air necessary for combustion is admitted, the blast being regulated, as required, by ordinary means.

The fire-gases as they leave the chamber at a high temperature pass through a flue 53 into a succession of heat-absorbing chambers 54 54, in which can be arranged suitable heat-utilizing appliances for generating steam or other purposes, after which they pass through an exit-flue 55 and issue into the distilling-chamber 1 at a considerably-reduced temperature, suitable for the reaction to take place in the said chamber. Known means can be employed for controlling the passage of the fire-gases from the incinerating-chamber 25 to the distilling-chamber 1. The incinerating-chamber may contain one or more open brick partitions 56, onto which the refuse matter falls as it is admitted into the incinerating-chamber 25 by the valves 24 and upon which the partly-desiccated refuse matter can be allowed to remain for the purpose of undergoing further desiccation before being finally disposed of by incineration. As it is being further desiccated the refuse matter becomes charred, and as the particles thereof decrease in size they fall through the openings of the partition 56 upon the fire-grate. A chamber 57, Fig. 1, is formed in the construction for the purpose of inspecting and controlling the appliances operating in the heat-absorbing chambers 54 54. 58 is an outlet-flue for the products of distillation mingled with whatever remains of the products of combustion. Such flue is connected to a fan, as usual, for drawing the said products and forcing them into a washing apparatus of any suitable kind for the purpose of producing a liquor, which is subsequently dealt with in order to recover the ammonia therein contained. Such washing and recovering operations do not form part of the present application.

The refuse matter to be distilled and incinerated is first subjected to the usual sorting operation for the purpose of eliminating certain non-combustible and other bodies—such, for instance, as broken glass, earthenware, tin cans, and the like—after which it is sifted either mechanically or by hand for the purpose of separating any loose matter, which after being desiccated constitutes a rich manure in powdered form and can be used directly as a fertilizer.

The operation is as follows: The gate 52 being closed, a generation of fire-gases being started either by a blast of ignited hydrocarbon produced in the known manner or by a coal or other fire in the incinerating-chamber 25, the feed-hopper 2 being charged with garbage and motive power being applied to the belt-pulley 10, an oscillating motion will first be imparted intermittingly to the charging-valves 4 through the instrumentality of the mechanism shown in Figs. 3 and 4 and garbage will be admitted into the distilling-chamber 1 and fall upon the trays 19 of the conveyer, while at the same time the conveyer will be put in motion and carry the garbage from right to left, in Fig. 1, until it is dumped upon the valves 24, to which an oscillating motion is also imparted intermittingly through the instrumentality of the mechanism shown in Figs. 5 and 6, whereby the garbage is allowed to fall upon the brick partition 56 of the incinerating-chamber 25, water being caused to circulate through the valves 24 and facings 33, as hereinbefore explained. As the garbage is being desiccated and charred the particles thereof decrease in size and fall, or are made to fall, by suitable stirrers (not shown) operated from the outside, upon the fire-grate and accumulate thereon at the same time as they burn. When a sufficient amount of partly desiccated and charred garbage has been introduced into the incinerating-chamber, it can alone constitute the fuel and the injection of hydrocarbon can be stopped, but it may be continued to a moderate extent to promote combustion. A blast of heated air is supplied to the fire-grate 47 to assist combustion, as described. The fire-gases escape through the flue 53 and after passing through the heat-absorbing chambers 54 54 issue through the flue 55 into the distilling-chamber 1, wherein they act to desiccate the garbage contained upon the moving conveyer and to distil the same, the products being drawn into the outlet-flue 58 by a fan and disposed of as hereinbefore stated. The distinct operations of distilling and incinerating are continuous and simultaneous. The speed of the conveyer can be regulated so as to suit the incinerating operation, and vice versa. It is held that the temperature in the distilling-chamber will range from 450° to 500° centigrade and that in the incinerating-chamber from 1,200° to 1,500° centigrade. When the car 50 is full of ashes, the operation of the furnace is stopped, the mechanisms are arrested, the blast is turned off from the fire-grate, the fan which draws the products of distillation and forces them into the washing apparatus is stopped, the gate 52 is opened, the car 50 is hauled out and is replaced by an empty one, after which the gate is again closed, the blast turned on, and the mechanisms, as well as the fan, are again started and the operation of the furnace is continued.

We claim—

1. The herein-described process of treating garbage consisting in distilling the same and then burning the residuum, the distillation being carried on at a relatively low temperature while shielding the fresh garbage from the air and by using some of the heat units developed in the burning of the residuum to raise the temperature of the fresh garbage, substantially as described.

2. The herein-described process of treating garbage consisting in subjecting it to a distillation and then subjecting the residuum to incineration, the heated products of combustion from the incineration of the garbage being passed into contact with the garbage while being distilled and the garbage being shielded from the air during the distillation, substantially as described.

3. The herein-described process of treating garbage consisting in distilling the same, then subjecting the residuum to incineration, the heated products from the incineration being reduced in temperature and then passed into contact with the garbage for the distilling operation, substantially as described.

4. The combination of a combustion-chamber, a substantially horizontal air-tight distilling-chamber situated with reference to the combustion-chamber so as to receive only a limited portion of the units of heat generated within the combustion-chamber, means for admitting garbage to the distilling-chamber, means for conveying the garbage through the distilling-chamber, means for discharging the residuum from the distilling-chamber to the combustion-chamber, and a duct for leading off the products of distillation.

5. A garbage distilling and incinerating furnace, comprising an air-tight distilling-chamber 1, means for feeding the same, an incinerating-chamber 25, means for feeding the same, both chambers being separated practically air-tight from each other, heat-absorbing flues, connecting the chambers and forming a circuitous passage between them, substantially as herein described and for the purpose set forth.

6. In combination, the low-temperature distilling-chamber practically air-tight having an outlet for distilled products, the high-temperature incinerating-chamber, and the connection between the two chambers which is practically air-tight and adapted to permit the feeding of the material from the distilling-chamber to the incinerating-chamber, substantially as described.

7. In combination in a garbage-furnace, a distilling-chamber, an incinerating-chamber, a conveyer in the distilling-chamber, the air-tight valve for feeding the distilling-chamber and the power-transmitting connections between the feeding-valve and the conveyer-shaft, substantially as described.

8. A garbage-furnace comprising a distilling-chamber, and a burning-chamber, means for excluding the air from the distilling-chamber, and means for transferring some of the heat units from the burning-chamber to heat the garbage in the distilling-chamber, substantially as described.

9. A garbage distilling and incinerating furnace comprising a distilling-chamber, means for feeding the same while shielding it from oxygen, a conveyer for the garbage, an incinerating-chamber, means for separating it practically air-tight from the distilling-chamber, means for feeding the incerating-chamber, with partly-distilled garbage from the distilling-chamber, while at the same time preventing the fire-gases in the incinerating-chamber from passing through the separating-vault into the distilling-chamber, a heat-reducing communication between the two chambers, means for closing up the furnace against entrance of atmospheric air except that which being necessary for combustion is supplied to the fire-grate by a forced draft, and means for collecting the products of distillation, substantially as herein described and shown and for the purpose set forth.

In witness whereof we have hereunto set our hands in presence of two witnesses.

JEAN FRANÇOIS GEORGES DE BONARDI.
AUGUSTE DENIS FLORAN DE VILLEPIGUE.

Witnesses:
R. H. BRANDON,
D. H. BRANDON.